United States Patent [19]

Joswig et al.

[11] Patent Number: 4,970,249
[45] Date of Patent: Nov. 13, 1990

[54] FLAMEPROOFED, READILY CRYSTALLIZING POLYETHYLENE TEREPHTHALATE MOLDING COMPOUNDS

[75] Inventors: Thomas Joswig, Viersen; Jürgen Kirsch, Cologne; Dieter Freitag, Krefeld, all of Fed. Rep. of Germany

[73] Assignee: Bayer Aktiengesellschaft, Leverkusen, Fed. Rep. of Germany

[21] Appl. No.: 411,013

[22] Filed: Sep. 22, 1989

[30] Foreign Application Priority Data

Oct. 4, 1988 [DE] Fed. Rep. of Germany ....... 3833694

[51] Int. Cl.$^5$ ................................................ C08K 5/53
[52] U.S. Cl. ..................................... 524/125; 524/412; 524/423; 524/605
[58] Field of Search ....................... 524/125, 423, 412; 525/165

[56] References Cited

U.S. PATENT DOCUMENTS

| 2,682,522 | 6/1954 | Coover et al. | 524/233 |
| 3,671,487 | 6/1972 | Abolins | 524/133 |
| 3,723,373 | 3/1973 | Lucas | 525/165 |
| 3,829,405 | 8/1974 | Cohen et al. | 524/125 |
| 3,838,092 | 9/1974 | Vogt et al. | 525/199 |
| 3,928,283 | 12/1975 | Masai et al. | 524/125 |
| 4,046,724 | 9/1977 | Kato et al. | 524/126 |
| 4,351,758 | 9/1982 | Lu et al. | 524/423 |
| 4,374,971 | 2/1983 | Schmidt et al. | 528/167 |
| 4,690,964 | 9/1987 | Schmidt et al. | 524/125 |
| 4,788,259 | 11/1988 | Nielinger et al. | 524/125 |

FOREIGN PATENT DOCUMENTS

| 324356 | 7/1989 | European Pat. Off. . |
| 1343937 | 1/1974 | United Kingdom . |
| 1401863 | 2/1975 | United Kingdom . |

Primary Examiner—Veronica P. Hoke
Attorney, Agent, or Firm—Connolly and Hutz

[57] ABSTRACT

The flameproofed, readily crystallizing polyethylene terephthalate molding compounds, which contain polyalkyl phosphonates and crystallization aids, may be used for the production of moldings, fibers or films.

7 Claims, No Drawings

FLAMEPROOFED, READILY CRYSTALLIZING POLYETHYLENE TEREPHTHALATE MOLDING COMPOUNDS

This invention relates to flameproofed, readily crystallizing polyethylene terephthalate molding compounds containing polyalkyl phosphonates and crystallization aids.

DE-OS 24 58 967 describes flame-resistant polyester molding compounds containing a polyalkylene terephthalate, which has bond units based on brominated organic aromatic compounds in the main chain, and high molecular weight organic phosphorus compounds. The polyester molding compounds described in DE-OS 24 58 967 are attended by the disadvantage that they always contain organically bound bromine in copolymerized form (danger of dioxin formation in the event of fire) and, because they are copolymers, are much more difficult to produce.

DE-OS 22 53 207 describes flame-retardant thermoplastic polyester resin compositions containing as constituents an inflammable high molecular weight, linear polyester resin and, as flameproofing additive, aryl phosphonates. DE-OS 21 11 202 also describes flame-resistant thermoplastic polyesters which contain phosphorus-containing additives, polyaryl phosphonates being mentioned as the phosphorus-containing additives. Applicants' own tests have shown that the flame-retardant thermoplastic polyesters described in the published patent applications cited above have inadequate flameproof properties. Another disadvantage is that the polyaryl phosphonates are difficult to incorporate in the thermoplastic polyesters.

DE-OS 21 32 350 describes phosphorus-containing polyester mixtures having improved flame-resistant properties which contain both alkyl phosphonates and polyaryl phosphonates as phosphorus-containing additives. DE-OS 21 32 350 also claims reinforced polyester molding resin mixtures (claims 7 to 10) containing polypropylene terephthalate or polybutylene terephthalate as polyesters and reinforcing fillers, such as glass fibers, and polyphosphonate or polyphosphonate phosphate. Applicants, own tests have shown that the reinforced polybutylene terephthalate molding resin mixtures containing polyalkyl phosphonate as flameretardant additive have an inadequate flame-retardant effect.

German patent application No. P 38 00 672.3 describes reinforced, flameproofed polyethylene terephthalate molding compounds which are flameproofed by polyalkyl phosphonates. The disadvantage of these phosphonate-flameproofed molding compounds is their reduced crystallization rate, in consequence of which the moldings obtained during extrusion of the molding compounds are amorphous. Accordingly, corresponding molding compounds cannot be used for applications requiring high heat resistance. Because of this, crystallization aids have to be added to such molding compounds.

However, it has been found that the effect of the known crystallization aids is inadequate. Accordingly, the object of the present invention is to provide readily crystallizing, flameproofed PET molding compounds having favorable technical properties which, if possible, are processible even at low mold temperatures ($\leq 100°$ C.).

Accordingly, the present invention relates to flameproofed, readily crystallizing polyethylene terephthalate molding compounds of (A) 45 to 80 and preferably 40 to 70 parts by weight polyethylene terephthalate having an intrinsic viscosity of $>0.30$ dl/g, (B) 1 to 25, preferably 3 to 20 and more preferably 5 to 15 parts by weight polyalkyl phosphonates corresponding to the following formula

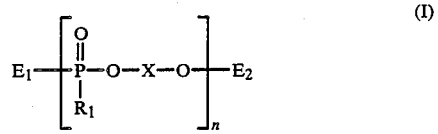

in which
$R_1$ represents $C_{1-6}$ alkyl,
X stands for the formula

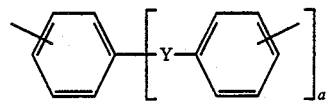

in which
Y is a single bond or represents $C_{1-3}$ alkylene, $C_{5-12}$ cycloalkylene or O, S, CO, SO$_2$ and
$a=0$ or 1, or
X represents naphthylene,
$E_1$ represents O-$R_2$, OH, O-X-OH, where $R_2$ represents
$C_{6-10}$ aryl and X is as defined above,

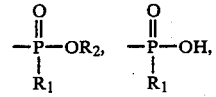

where $R_1$ and $R_2$ are as defined above,
and
n represents integers of 2 to 100, (C) 0.01 to 10 and preferably 0.1 to 8 parts by weight ultrafine barium sulfate, (D) 0.01 to 5 and preferably 0.1 to 4 parts by weight fluorinated polyolefins, (E) optionally 0.1 to 40 parts by weight inorganic reforcing agents and (F) optionally 0.1 to 10 parts by weight processing aids.

The polyethylene terephthalates used in accordance with the invention represent polycondensation products of aromatic dicarboxylic acids or reactive derivatives thereof (such as dimethyl esters) and aliphatic diols or reactive derivatives thereof; at least 90 mol-%, based on the diol component, may be ethylene glycol units while 10 mol-%, based on the diol component, may be aliphatic or cycloaliphatic, branched or unbranched $C_{3-18}$ diol units or polyalkylene oxide units (cf. for example DE 25 07 776, 24 07 074 and 24 07 776). Preferred polyethylene terephthalates contain at least 95 mol-% ethylene glycol units, based on the total diol component. Pure polyethylene terephthalate is particularly preferred.

The polyethylene terephthalates may be produced by known methods (cf. for example Kunststoff-Handbuch, Vol. VIII, pages 695 et se., Carl-Hanser-Verlag, Munchen 1973).

The polyethylene terephthalates used in accordance with the invention have intrinsic viscosities of preferably from 0.4 to 1.3 dl/g and more preferably from 0.5 to 0.9 dl/g, as measured in phenol/o-dichlorobenzene (1:1 parts by weight) in a concentration of 5 g/at 25° C.

The polyalkyl phosphonates used in accordance with the invention are described, for example, in US 2,682,522, in DE-OS 29 25 207 or in DE-OS 29 44 093.

Polyalkyl phosphonates corresponding to formula (II) are preferably used:

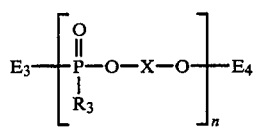

In formula (II), $R_3$ represents methyl or ethyl,

X represents phenylene, bisphenylene, $C_{1-3}$ alkyl bisphenylene, $C_{5-12}$ cycloalkyl bisphenylene, sulfonyl bisphenylene, oxobisphenylene, thiobisphenylene, carbonyl bisphenylene or naphthylene,

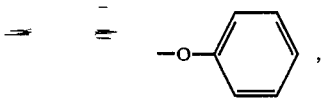

where X is as defined above,

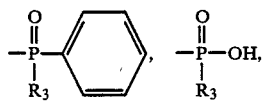

where $R_3$ is as defined above, and n represents integers of 5 to 80.

It is particularly preferred to use polyalkyl phosphonates corresponding to general formula (II), in which

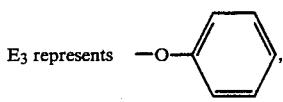

$E_3$ represents

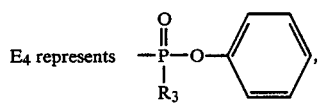

$E_4$ represents $R_3$ represents methyl and

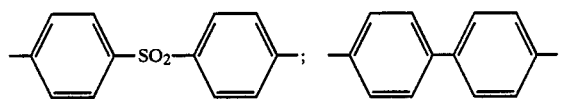

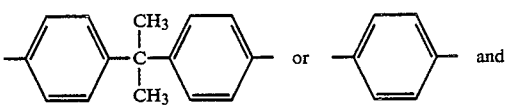

n=5 to 50.

The following are mentioned as examples of polyalkyl phosphates: bisphenol F polymethane phosphonate, bisphenol A polymethane phosphonate, dihydroxydiphenyl polymethane phosphonate, dihydroxydiphenyl sulfone polymethane phosphonate, catechol polymethane phosphonate, resorcinol polymethane phosphonate and/or hydroquinone polymethane phosphonate, preferably bisphenol F polymethane phosphonate, dihydroxydiphenyl polymethane phosphonate and/or hydroquinone polymethane phosphonate.

The polyphosphonates used in accordance with the invention may optionally be branched by small quantities of polyfunctional compounds. The quantity of branching agent is <5 mol-%, based on the quantity of bisphenol used. Suitable branching agents are trifunctional and tetrafunctional hydroxy compounds, such as 4,6-dimethyl-2,4,6-tri(4-hydroxyphenyl)-heptane; 1,3,5-tri-(4-hydroxyphenyl)benzene and 1,4-bis-(4,4'-dihydroxytriphenylmethyl)-benzene, trifunctional or tetrafunctional carboxylic acid aryl esters, such as trimesic acid triphenyl ester and pyromellitic acid tetraphenyl ester, and phosphoric acid triaryl esters, such as triphenyl phosphate. Tris-1,3,5-[(4-hydroxy-2-phenylene-2-propylidene)-benzene is preferably used as the branching agent.

The polyalkyl phosphonates used in accordance with the invention generally have a relative solution viscosity of 1.05 (corresponding to an average molecular weight of 2,000 [n approx. 8 monomer units]) to 1.40 (corresponding to an average molecular weight of 22,000 [n approx. 90 monomer units]). The solution viscosity was measured in methylene chloride (0.5 g/100 ml solution) at 25° C.

The ultrafine barium sulfate used as component C), which is prepared by combining separate aqueous solutions containing equivalent quantities of barium ions and sulfate ions, and separating off the precipitate (to prepare precipitated barium sulfate having a primary particle size of <0.1 μm, the aqueous solutions of the reactants are continuously divided up in a closed reactor into a large number of partial volumes which are combined into discrete precipitation volumes having an average size of <1 μl and the resulting suspension of the precipitate is continuously removed from the reactor) is described in detail in German patent application P 38 10 423.7.

The primary particle size of the ultrafine barium sulfate is preferably from 0.09 to 0.01 μm (BET surface: 80 to 5 m²/g and preferably 40 to 10 m²/g).

The fluorinated polyolefins used as component D) are described, for example, in "Vinyl and Related Polymers" by Schildknecht, John Wiley & Sons, Inc., New York, 1962, pages 484–494; "Fluoropolymers" by Wall, Wiley-Interscience, John Wiley & Sons, Inc., New York, Vol. 13, 1970, pages 623–654; "Modern Plastics Encyclopedia", 1970–1971, Vol. 47, No. 10 A, October 1970, McGraw-Hill, Inc., New York, pages 134 and 774; "Modern Plastics Encyclopedia", 1975–1976, October 1975, Vol. 52, No. 10 A, McGraw-Hill, Inc., New York, pages 27, 28 and 472 and in US-PS 3,671, 487, 3,723,373 and 3,838,092.

Polytetrafluoroethylene (PTFE) is preferably used.

The inorganic reinforcing agents (component E)) used in accordance with the invention include any known agents used for reinforcing polyalkylene terephthalates such as, for example, glass fibers, glass beads and/or mineral fillers, as described in Katz and Milewski, "Handbook of Fillers and Reinforcements for Plastics", Nostrand, 1978. Glass fibers are preferably used as inorganic reinforcing materials. The glass fibers used generally have a diameter of from about 6 to 15 μm and preferably from 8 to 13 μm and a length-to-thickness ratio of greater than 45 and preferably from 50 to 200.

Kaolin, talcum, mica, quartz powder, mineral powder, alkaline earth metal carbonates, alkaline earth metal oxides, titanium dioxide and/or zinc sulfide are mentioned as examples of mineral fillers. The mineral fillers used have mean particle diameters of less than 20 μm, preferably less than 10 μm and, more preferably, less than 2 to 8 μm.

The inorganic reinforcing materials are preferably used in quantities of from 20 to 35 parts by weight and more preferably in quantities of from 25 to 30 parts by weight.

Known mold release agents, stabilizers, flow aids, coloring agents, plasticizers and/or colored pigments may be added to the molding compounds according to the invention as processing aids (component F).

Suitable mold release agents are any of the known products, such as ester waxes (for example montan wax), amide wax, such as Rhenax ®, and/or oligoethylenes. Suitable plasticizers are, for example, aliphatic oligomeric polyesters (cf. EP 29 931 and DE 27 06 128).

The processing aids are preferably added to the polyethylene terephthalate molding compounds in quantities of 0.3 to 5 parts by weight and more preferably in quantities of 0.4 to 2 parts by weight.

The mixtures of thermoplastic polyethylene terephthalate, crystallization aids, polyalkyl phosphonate, optionally processing aids and reinforcing materials may be prepared in standard mixing units, such as mixing rolls, kneaders, single-screw and multiple-screw extruders. The processing aids may be added as concentrates in thermoplastic polyester, in granulate form or in the form of a powder mixture during compounding of the components. The temperature prevailing during production of the mixtures is generally at least 20° C. and should be at most 70° C. above the melting point of the polyester.

The production process may be carried out both discontinuously and also continuously under conditions which largely preclude oxidation, i.e. in an inert gas atmosphere. Suitable inert gases are, for example, nitrogen, carbon dioxide and/or argon.

The polymer mixtures may optionally be subjected to a thermal aftertreatment in the solid phase at temperatures in the range from 100 to 220° C. and preferably at temperatures in the range from 180 to 210° C.

The thermoplastic molding compounds according to the invention may be processed to moldings at melt temperatures of up to 40° C. above the melting point of the polyester (250 to 290° C.) and with melt residence times of up to 9 minutes (1 to 9 minutes). Preferred processing conditions are those where the melt temperatures are no higher than 270° C. and the melt residence times are no longer than 9 minutes. Under particularly preferred processing conditions, the melt temperatures are no higher than 260° C. and the melt residence times no longer than 6 minutes.

The polyethylene terephthalate molding compounds according to the invention may be used in the production of moldings, fibers or films.

The polyethylene terephthalate molding compounds according to the invention have the following advantages over the flameproofed, reinforced polyethylene terephthalate molding compounds known from the prior art: they have an increased crystallization rate for high flame resistance in relation to the molding compounds hitherto flameproofed with polyphosphonates and the danger of toxic gas emission (dioxins) is reduced in relation to molding compounds flameproofed with Sb/Br compounds.

In addition to the above-mentioned advantages of the polyethylene terephthalate molding compounds according to the invention, it is particularly surprising that the combination of ultrafine barium sulfate and fluorinated polyolefins distinctly improves the tendency of the polyethylene terephthalate/polyalkyl phosphonate mixtures towards crystallization, i.e. the molding compounds show accelerated crystallization, although there is no evidence of any such effect where fluorinated polyolefins or finely divided barium sulfate are used on their own. This means that the combination of fluorinated polyolefins and ultrafine barium sulfate has a synergistic effect on the polyethylene terephthalate molding compounds in regard to crystallization.

EXAMPLES

I. Components used
1. Polyethylene terephthalate having an intrinsic viscosity of 0.72 dl/g, as measured in a mixture of phenol and o-dichlorobenzene (ratio by weight 1:1) at 25° C. in an Ubbelohde viscosimeter.
2. Dihydroxydiphenyl polymethane phosphonate branched with 1.56 mol-% tris-1,3,5-[(4-hydroxy)-2-phenylene 2-propylidene]-benzene)

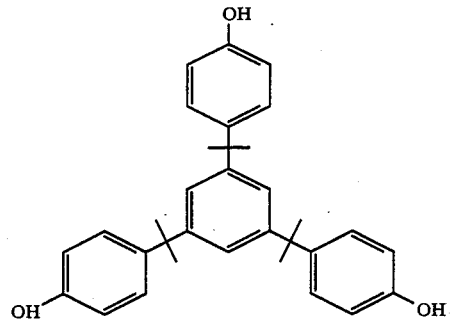

3. Ultrafine barium sulfate as described in German patent application P 38 10 423.7 (particle size: 0.07 to 0.04 μm, BET surface: 60 to 30 m²/g).
4. PTFE (Hostaflon TF 2027, a product of HOECHST AG).

II. Preparation of the polyphosphonate

A. (POP)
25 mol (4650 g) 4,4-dihydroxydiphenyl
25.1 mol (6225 g) methane phosphonic diphenyl ester
0.39 mol (187.2 g) component 1
2.15 mmol (0.25 g) sodium phenolate
1 mol (214 g) diphenyl carbonate The constituents are intensively mixed under nitrogen in an autoclave at 250° C., being distilled off through a column heated to 100° C. over a period of 3 hours under a vacuum falling from 250 to 100 bar and at a temperature increasing from 250° C. to 265° C. Transesterification is then continued for 5 hours under a pressure gradually falling to 0.3 mbar and at a temperature increasing to 310° C., the viscosity of the melt increasing. After purging with nitrogen, the polymer is left to settle with the stirrer off and 5.3 kg polyphosphonate are obtained by spinning off under pressure and granulating the melt strand. The polyphosphonate has a relative viscosity of 1.15 (as measured in methylene chloride, 0.5 g/100 ml solution).

III. Production, processing and testing of the molding compounds

The polyethylene terephthalate is used in granulate form. The polyalkyl phosphonates (POP) are used in powder form. The components used are melted, mixed and extruded to strands in a twin-screw extruder and then granulated. The molding compounds may be produced, for example, in a Werner & Pfleiderer ZSK 32 extruder at melt temperatures of 270 to 280° C., at a screw speed of 130 r.p.m. and with a throughput of 8 kg/h.

After adequate drying (for example 3 to 4 hours at 120° C.), the molding compounds are injection-molded to test specimens or standard test bars in typical injection molding machines at melt temperatures of 250 to 270° C., at a mold temperature of 80 to 100° C. and with a melt residence time of no longer than 9 minutes.

Flame resistance is tested under the Underwriters Laboratories' guidelines (UL-94-Test). The results are shown in the following Tables. The quantities of components used are shown in parts by weight.

Heat resistance is determined by measurement of Vicat B in accordance with ISO 306/DIN 53 460 which may also be used as an approximate measure of crystallinity.

The table shows an Example according to the invention (4) in comparison with the prior art (Examples 1 to 3).

TABLE

| Example | 1 (comparison) | 2 (comparison) | 3 (comparison) | 4 |
|---|---|---|---|---|
| PET (%) | 57.5 | 54.5 | 57 | 54 |
| POP (%) | 12.5 | 12.5 | 12.5 | 12.5 |
| Glass fibers (%) | 30 | 30 | 30 | 30 |
| BaSO₄ (%) | — | 3.0 | — | 3.0 |
| PTFE (%) | — | — | 0.5 | 0.5 |
| UL-94 2d/7d | VO/VO | VO/VO | VO/VO | VO/VO |
| Vicat B (°C.) | 94 | 94 | 98 | 212 |

The Table shows that it is only through the combination of the two basically ineffectual, i.e. non-nucleating, substances that a drastic improvement can be obtained in the Vicat B value with the favorable flameproof properties intact.

I claim:

1. Flameproofed, readily crystallizing polyethylene terephthalate molding compounds of
(A) 45 to 80 parts by weight polyethylene terephthalate having an intrinsic viscosity of >0.30 dl/g, as measured in a mixture of phenol and o-dichlorobenzene (1:1, 25° C., 0.5 g/100 ml),
(B) 1 to 25, parts by weight polyalkyl phosphonates corresponding to the following formula

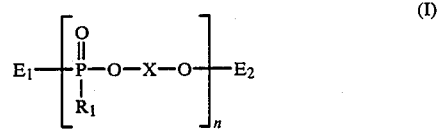

(I)

in which
$R_1$ represents $C_{1-6}$ alkyl,
X stands for the formula

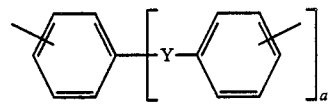

in which
Y is a single bond or represents $C_{1-3}$ alkylene, $C_{5-12}$ cycloalkyline or O, S, CO, $SO_2$ and
a=0 or 1, or
X represents naphthylene,
$E_1$ represents $O-R_2$, OH, O-X-OH, where $R_2$ represents $C_{6-10}$ aryl and X is as defined above,

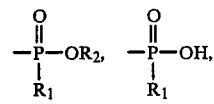

where $R_1$ and $R_2$ are as defined above, and
n represents integers of 2 to 100,
(C) 0.01 to 10 parts by weight ultrafine barium sulfate
(D) 0.01 to 5 parts by weight fluorinated polyolefins, having a particle size of from about 0.01 to about 0.09 μm
(E) optionally 0.1 to 40 parts by weight inorganic reforcing agents and
(F) optionally 0.1 to 10 parts by weight processing aids.

2. Molding compounds as claimed in claim 1 characterized in that they contain bis-4-hydroxy-phenylmethane phosphonate, 2,2-bis(4-hydroxy-phenyl) propane polymethane phosphonate, dihydroxydiphenyl polymethane phosphonate, dihydroxydiphenyl sulfone polymethane phosphonate, catechol polymethane phosphonate, resorcinol polymethane phosphonate and/or hydroquinone polymethane phosphonate as the polyalkyl phosphonate.

3. Molding compounds as claimed in claim 1 characterized in that they contain polytetrafluoroethylene (PTFE) as the fluorinated polyolefin.

4. Molding compounds as claimed in claim 1, characterized in that they contain glass fibers, glass beads and/or mineral fillers as inorganic reinforcing materials.

5. Molding compounds as claimed in claim 1, characterized in that they contain glass fibers as inorganic reinforcing material.

6. Molding compounds as claimed in claim 1, characterized in that they contain mold release agents, stabilizers, flow aids, coloring agents, colored pigments and/or plasticizers as processing aids.

7. Moldings, fibers or films comprising the thermoplastic molding compounds of claim 1.

* * * * *